United States Patent [19]

Horak

[11] 4,206,478

[45] Jun. 3, 1980

[54] TIME BASE CORRECTION CIRCUIT EMPLOYING CONTROLLED PARALLEL SIGNAL TRANSFERS BETWEEN ANALOG STORAGE REGISTERS

[75] Inventor: Jerry R. Horak, Rochester, N.Y.

[73] Assignee: Eastman Kodak Company, Rochester, N.Y.

[21] Appl. No.: 16,052

[22] Filed: Feb. 28, 1979

Related U.S. Application Data

[63] Continuation-in-part of Ser. No. 872,718, Jan. 26, 1978, abandoned.

[51] Int. Cl.² .................................................. H04N 5/76
[52] U.S. Cl. ...................................... 358/160; 358/8; 360/36
[58] Field of Search ................. 358/8, 160; 360/36, 360/37

[56] References Cited

U.S. PATENT DOCUMENTS

| | | | |
|---|---|---|---|
| 3,947,874 | 3/1976 | Lentz | 360/36 |
| 4,074,307 | 2/1978 | Dischert et al. | 358/8 |
| 4,133,009 | 1/1979 | Kittler et al. | 360/9 |

*Primary Examiner*—Robert L. Richardson
*Attorney, Agent, or Firm*—Robert F. Cody

[57] ABSTRACT

A circuit for correcting a fluttering video signal to conform to a standard time base utilizes a set of analog shift registers that are specially adapted to permit controlled parallel transfer of video line-scan information between registers. Such provision for parallel transfers permits exclusive assignment of input and output functions (and corresponding clocking) to respective registers. In a presently preferred implementation, three charge-transfer-type registers are aligned side by side on a single "chip" and control of parallel charge transfers between each cooperating pair of adjacent registers is achieved through the use of an interposed electrode structure.

2 Claims, 5 Drawing Figures

FIG. 1
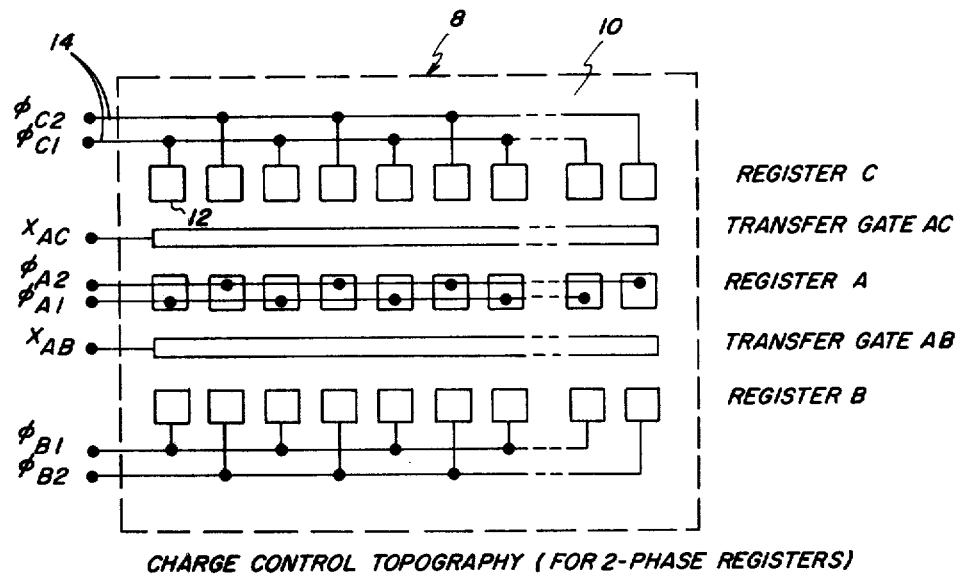
CHARGE CONTROL TOPOGRAPHY (FOR 2-PHASE REGISTERS)
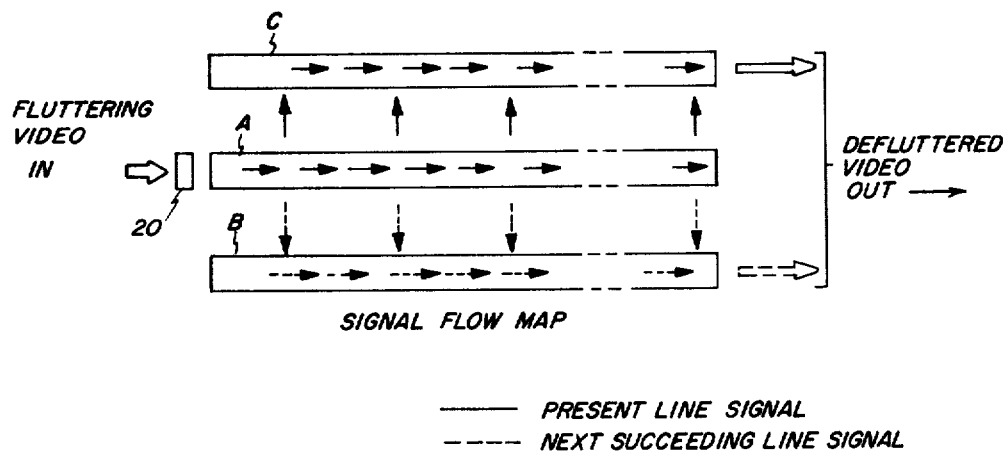
SIGNAL FLOW MAP
——— PRESENT LINE SIGNAL
– – – NEXT SUCCEEDING LINE SIGNAL
FIG. 2

TIME BASE CORRECTION CIRCUIT EMPLOYING CONTROLLED PARALLEL SIGNAL TRANSFERS BETWEEN ANALOG STORAGE REGISTERS

CROSS-REFERENCE TO RELATED APPLICATIONS

This is a continuation-in-part of my earlier filed application Ser. No. 872,718, filed On Jan. 26, 1978 and now abandoned.

U.S. Application Ser. No. 872,716 entitled BUFFERED TIME BASE CORRECTION CIRCUIT to John S. Hayward, filed of even data herewith; the disclosure of which is hereby incorporated herein by reference.

BACKGROUND OF THE INVENTION

1. Field of the Invention

The present invention relates to apparatus for applying time base corrections to video signals.

2. Description Relative to the Prior Art

In transmitting video signals, particularly where record/playback operations are included, one series problem is that of maintaining a time base consistent with a standard format for video signals, for example, the conventional NTSC signal format. Time base departures from a standard, say the 63.5 μsec. period for one line of a video frame of the NTSC standard, may occur over a wide range of frequencies and are generally referred to as signal flutter.

TV sets are typically adapted to tolerate lowamplitude flutter at low frequencies by including circuitry for loosely slaving the display to the time base of the signal. (To lock the display tightly to the signal time base would introduce objectionable instabilities.) Also, phase-lock-type speed controls on record/playback systems can be designed to eliminate, from a practical standpoint, low frequency flutter, e.g. flutter at frequencies well below the video field frequency. Higher frequency flutter, which may result from such causes as recording-tape-stretch variations and signal-transmission-time variations, proves more difficult to avoid. Such flutter, moreover, is not easily compensated for in the signal processing of a TV set, and can result in picture distortions or other irritating display problems.

One solution to the higher frequency flutter problem, in the case of digital video signals (including of course analog signals converted to a digital form), is to store coded signal components in a digital storage buffer at the incoming rate and then "retrieve" such components in the same sequence but at the standard rate. The storage buffer then absorbs the short time variations by, in effect, expanding and compressing in length in accordance with the differentials in signal rates (see e.g. U.S. Pat. No. 3,860,952). This approach, while effective, is expensive and is best suited to use in video broadcast studios.

A defluttering approach more suited to consumer video systems employs analog shift registers to remove flutter. With this approach video signals are typically read into the registers, one-line-per-register, at the incoming signal rate. Two or more registers receive the signals sequentially and the signal information is read out at the standard rate in the same sequence (see e.g. U.S. Pat. No. 3,931,638). While such an approach is effective for time base correction it does tend to require a great deal of clocking signal and video signal switching. See, also, Fairchild Journal of Semiconductor Progress, Vol. 3, No. 5, Sept, Oct. 1975, pages 16, 17, which discloses a defluttering technique employing input and output registers which sandwich a gate structure adapted for parallel transfer of signals from the input register to the output register.

SUMMARY OF THE INVENTION

In apparatus for removing time base variations from a video signal, simplified signal flow and signal clocking are achieved by use of a parallel arrangement of analog registers which includes special gates for permitting controlled parallel transfer of lines of video information from one register to the next. By so providing for controlled parallel signal transfer, individual registers may be designated to perform specific functions, e.g. receiving the fluttering video signal or reading out the signal at a standard rate. This design permits fixed clocking connections; i.e. rather than activate a register at a fluttered rate for input and at the standard rate for output, as is conventional, apparatus according to the invention utilizes a given register to perform one processing function repeatedly and, attendantly, such register requires at most only one type of clocking (e.g. fluttered or relatively stable clocking).

In a presently preferred implementation, first and second output registers are arranged on either side of an input register. Transfer gates are interposed between the input register and the two output registers to control parallel signal transfers; and the destination for such signal transfers is caused to alternate between the first and the second output register on a line-by-line basis. A fluttered clock activates the input register and a stable clock activates the two output registers alternately.

Registers for use according to the invention are preferably of the charge-transfer type and are arranged in a parallel configuration with interposed parallel electrodes which serve to control parallel transfers of image representative charge packets between registers. The video signal processed by such apparatus is preferably direct analog.

The invention will now be described in detail with reference to the drawings wherein:

FIG. 1 is a diagram indicating a presently preferred electrode topography for controlling the transfer of image representative charge packets according to the invention;

FIG. 2 is a diagram indicating a presently preferred signal flow pattern according to the invention;

Figure 3A:
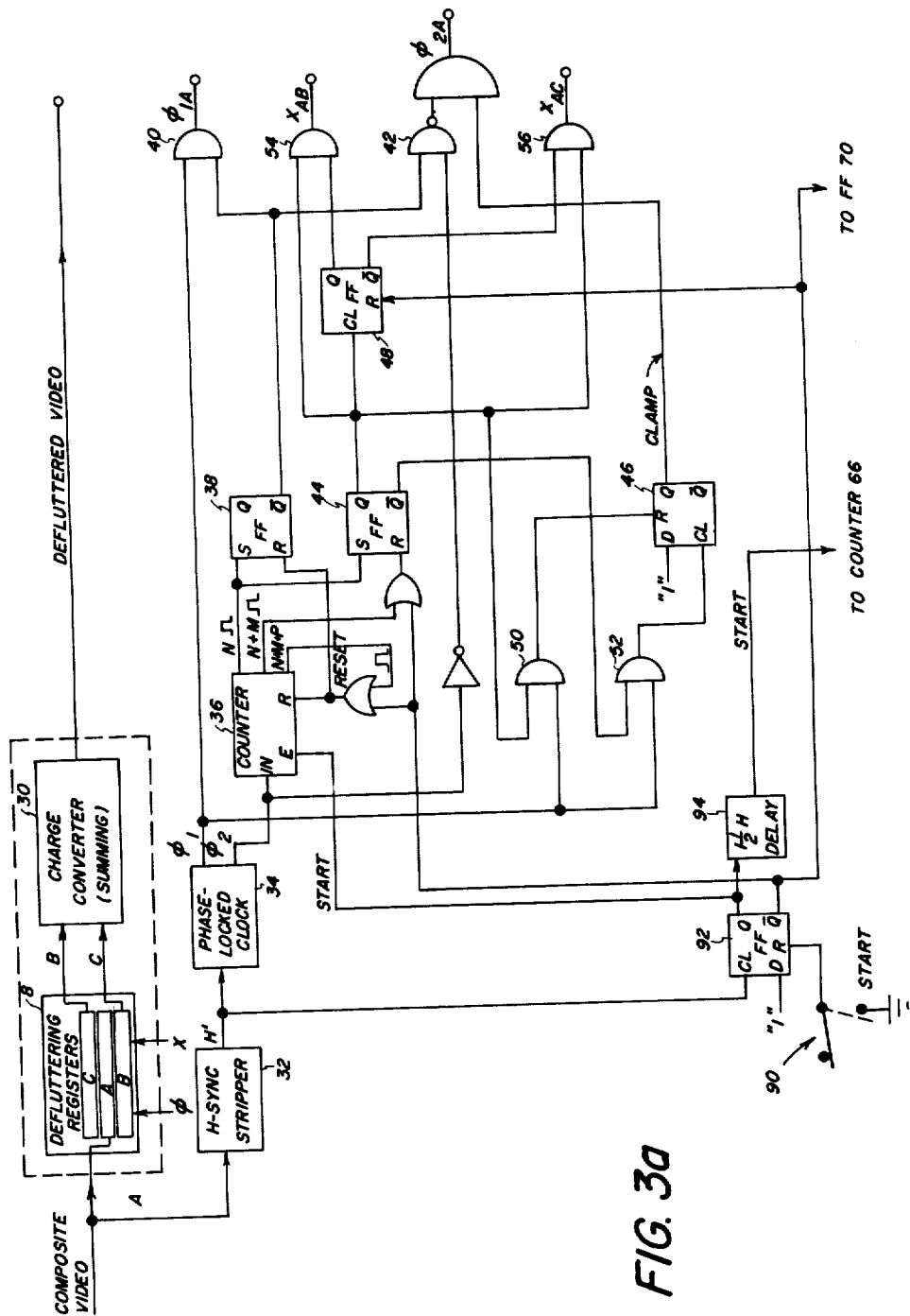
FIG. 3 (a, b) is a diagram indicating circuitry for the presently preferred implementation of the invention.

Referring to FIG. 1, a presently preferred subcircuit 8 for use in implementing the invention employs three analog shift registers (denoted A, B and C) which are of the charge-transfer type and are desirably arranged, as is discussed more fully below, on a single silicon substrate 10. For clarity of illustration, the registers A, B and C are indicated as respective alignments of electrodes such as the electrode 12. Clocking connections such as the channels 14 for the register C are indicated assuming two-phase operation (for details regarding physical implementation of charge-transfer registers see Sequin and Tompsett, "Charge Transfer Devices," pp.

19–61, Academic Press Inc. 1975). Interposed between the individual registers A, B and C are transfer gates AB and AC which are basically elongated electrode structures. Such electrode structures are arranged alongside the charge wells of the registers, and are electrically isolated from the substrate by a layer of silicon dioxide. By adjusting the relative potentials of a cooperating pair of adjacent registers and the transfer gate a voltage gradient is created for forcing a desired register to effect charge transfer (the polarity will depend on the character of the charge stored, i.e. electrons or holes). Such operation is indicated, for example, in Fairchild Preliminary Data Sheet CCD 110. Construction of the preferred charge transfer structure, it should be appreciated, is well within the skill level in the charge-transfer device art once the general topography and operating methodology are known.

Now considering signal flow within the subcircuit 8 as indicated in FIG. 2, the incoming video signal passes through an input gate 20 of the register A and then passes alternately—under control of the transfer gates AB and AC (see FIG. 1)—to the two adjacent registers B and C. The output signals from registers B and C are then preferably multiplexed to provide a single video output signal.

Figure 3B:
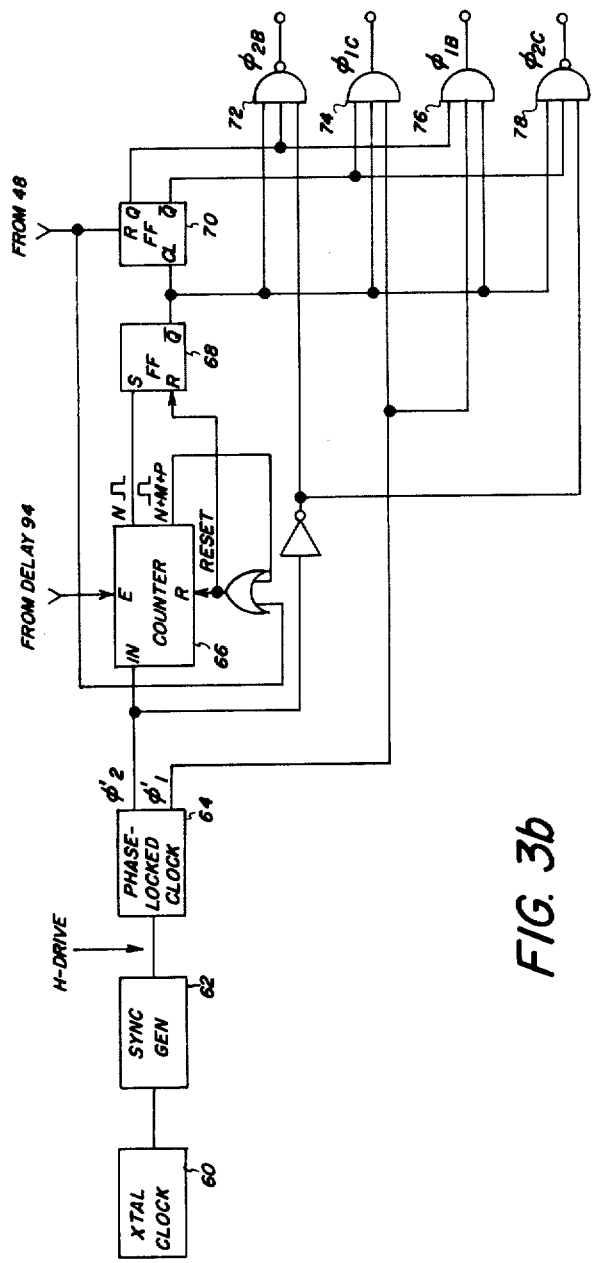

Referring to FIG. 3, overall circuitry for implementing time base correction according to a presently preferred methodology for practicing the invention includes a subcircuit 8 as described above and a charge converter 30, which converts image representative charge packets from registers B and C to analog signals (see Sequin et al, supra, pp. 52–58 for a discussion of means for implementing charge detection). Such converter 30, preferably, includes means such as an analog summing circuit (not shown) for multiplexing such signals to produce a single video output, as mentioned above.

A sync stripper 32 receives the incoming composite video signal and provides a pulse-type signal H' for indicating the corresponding time base, i.e. the fluttering time base of the incoming signal. The signal H' is the reference for a phase-locked clock 34 that, based on the period of the signal H' produces phase signals $\Phi_1$ and $\Phi_2$ of the type used in activating a two-phase, charge-transfer-type register. Timing of the application of such phase signals to the register A is coordinated by a counter 36, where a pulse count total is maintained based on the $\Phi_2$ signal. An output pulse is generated by the counter 36 whenever the count total corresponds to the number of stages for the register A (say, N stages). A pulse is also produced by the counter 36 whenever the total reaches a level corresponding to the end of a parallel transfer period (say, a count of N+M which is selected to correspond to less than a line period) and at the end of a line period (say, a count of N+M+P which is selected to correspond to the pulse multiplication factor of the clock 34). Such latter pulse resets the counter 36 to zero.

By means of a flip-flop 38 which receives the N count and N+M+P count signals, a set of gates 40 and 42 are controlled to pass phase signals $\Phi_1$ and $\Phi_2$ for the duration of the count to N, a period sufficient to permit register A to be filled. (Such gated phase signals are denoted $\Phi_{1A}$ and $\Phi_{2A}$ in FIGS. 3 and 4).

Figure 4:
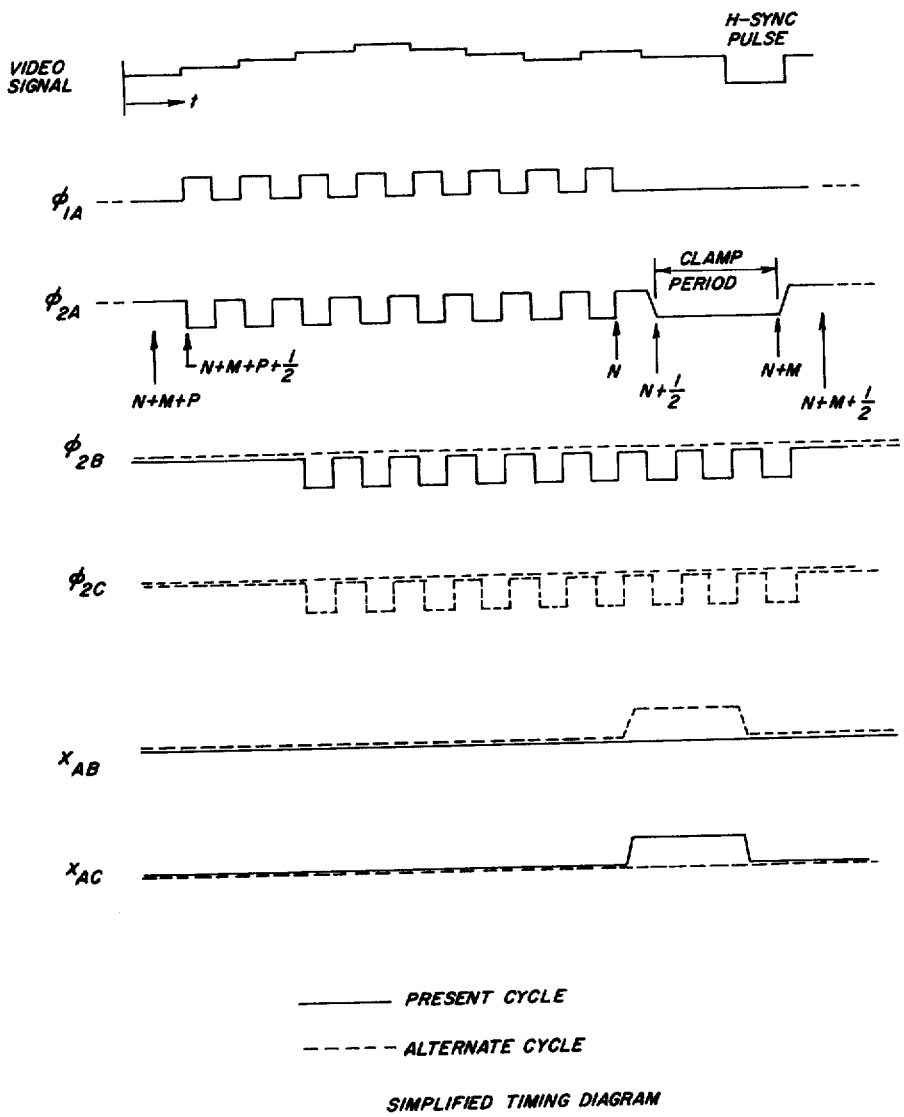
FIG. 4 is a simplified timing diagram for the deflutterering subcircuit control signals produced by the circuit of FIG. 3.

A transfer coordinating circuit includes a set of flip-flops (denoted individually as flip-flops 44, 46 and 48) and gates (denoted individually as gates 50, 52, 54 and 56). Such circuit produces transfer signals $X_{AB}$ and $X_{AC}$ (which alternate as indicated in FIG. 4); and also clamps the $\Phi_{2A}$ signal at a level to remove the charge wells from the phase 2 sections of the register A stages during parallel transfer periods (see the clamp period indicated for the signal $\Phi_{2A}$ in FIG. 4).

To control the shifting of signal information in registers B and C, a stable clock 60, having a clock rate corresponding to the standard video line frequency, triggers a sync generator 62 (which may additionally be used to supply sync wave forms for addition to the defluttered video signal if desired); and the H-drive output of such generator provides a reference signal for a phase-locked clock 64. At the clock 64, "basic" phase signals $\Phi'_1$ and $\Phi'_2$ are produced which are of a type suitable for activating a two-phase charge-coupled register. Gating of the basic phase signals to produce phase signals ($\Phi_{1B}$, $\Phi_{2B}$, $\Phi_{1C}$ and $\Phi_{2C}$) for activating registers B and C is coordinated by a counter 66 working in conjunction with flip-flops 68 and 70 and gates 72, 74, 76 and 78. In operation, the flip-flop 68 cooperates with gates 72, 74, 76 and 78 to block the basic phase signals $\Phi'_1$ and $\Phi'_2$ after register B or C has been emptied (a count of N as discussed above) and until a new line period starts (a count of N+M+P).

Alternation of phase signal application between the registers B and C is achieved using the flip-flop 70 in clock mode to toggle the gate pairs 72, 76 and 74, 78 on a line-by-line basis, i.e. the gates 72 and 76 pass the basic phase signals $\Phi'_1$, $\Phi'_2$ for every other line period to produce phase signals $\Phi_{2B}$ and $\Phi_{1B}$, respectively; whereas, the gates 74 and 78 pass the basic phase signals during the remaining line periods to produce the phase signals $\Phi_{1C}$ and $\Phi_{2C}$, respectively. Waveforms for signals $\Phi_{2B}$ and $\Phi_{2C}$ are indicated in FIG. 4. The signals $\Phi_{1B}$ and $\Phi_{2B}$ then activate register B and signals $\Phi_{1C}$ and $\Phi_{2C}$ activate register C.

A starter subcircuit is provided to synchronize operation of the overall defluttering circuit to the incoming video signal and to trigger register operations to begin with the registers B and C operating one and one-half line periods behind register A. Such a one and one-half line period shift allows for compensation of signals that have been either expanded or compressed by time base distortions, because the output registers B and C are afforded margin to either fall back further or to gain on register A in order to match the output video signal to a time base standard.

The starter subcircuit may, for example, include a start switch 90, a flip-flop 92 and a one and one-half period delay device 94. The start switch 90 when actuated produces a signal for initializing the flip-flops 48, 70 and 92 to the reset state. Flip-flop 92 is set by the horizontal sync signal H' and serves to enable the counter 36. The counter 66 is enabled one and one-half line periods later as a result of the delay interposed by the delay device 94.

It should be appreciated that, with the above described apparatus, the register B will initially read out the video signal one and one-half line periods after the signal is read into register A. As time continues the delay between input and output is caused to diminish or enlarge, as necessary, to conform the signal to a selected standard, i.e. the standard employed in selecting the frequency for the clock 60.

The invention has been described in detail with reference to a presently preferred implementation thereof. However, it will be appreciated that variations and modifications may be effected within the spirit and scope of the invention. For example, registers that are not of the charge-transfer type might be employed in cooperation with suitable gating means for permitting controlled parallel register-to-register signal transfers. Also, the register-to-register signal flow pattern might be changed while retaining parallel signal transfers and exclusive assignment of input and output functions to respective registers. Also, three- and four-phase registers might be employed with corresponding reworking of the control signal circuitry.

What is claimed is:

1. Apparatus capable of defluttering a video signal of the type which includes a succession of video line signal components, said apparatus comprising:
   (a) first analog shift register means for receiving and successively storing said video line signal components;
   (b) first timing means for effecting line signal component shifts into and within said first analog shift register means at a rate corresponding to a time base characteristic of the received video signal;
   (c) output means;
   (d) second analog shift register means for applying line signal components to said output means, said second analog shift register means being comprised of first and second output shift registers, said first and second output shift registers being both connected to said output means;
   (e) second timing means for effecting line signal component shifts within and out of said second analog shift register means at a relatively stable rate; and
   (f) gating means for so controlling parallel transfers of line signal components from said first analog shift register means to said second analog shift register means that successive line signal components are alternately respectively transferred in parallel to said first and second output shift registers,
whereby a stable flow of video signal information to said output means is achieved.

2. Apparatus useful in defluttering a video signal which comprises a succession of generally periodic line signals and timed sync components, said apparatus being characterized by:
   (a) input analog shift register means for receiving and successively storing the video line signals;
   (b) first timing means responsive to said timed sync components for controlling advancement of said video line signals into and within said input analog shift register means;
   (c) terminal means;
   (d) output analog shift register means, comprised of first and second analog shift registers which are both connected to said terminal means;
   (e) second timing means for controlling advancement of signals within said first and second analog shift registers at a preselected stable rate;
   (f) counter means responsive to said timed sync components and cooperative with said input and analog shift register means for producing a gate signal when said counter means reaches a predetermined count corresponding to a predetermined number of stages of said input analog shift register means; and
   (g) gate means, cooperative with said input and output analog shift register means and responsive to said gate signal for transferring line signals from said input analog shift register means alternately to said first and second analog shift registers of said output analog shift register means.

* * * * *